US005555582A

United States Patent [19]

Jerideau

[11] Patent Number: 5,555,582

[45] Date of Patent: Sep. 17, 1996

[54] CONVERTIBLE BED

[76] Inventor: Thomas H. Jerideau, 209 Kennington Dr., Goose Creek, S.C. 29445

[21] Appl. No.: 400,746

[22] Filed: Mar. 6, 1995

[51] Int. Cl.$^6$ ................................ A61C 7/00; A61C 7/10

[52] U.S. Cl. ........................................ 5/600; 5/86.1; 5/613

[58] Field of Search ................................ 5/612, 613, 617, 5/81.1, 86.1, 600, 624; 297/DIG. 4

[56] References Cited

U.S. PATENT DOCUMENTS

| | | | |
|---|---|---|---|
| 1,710,821 | 4/1929 | Hackney | 5/86.1 |
| 2,607,929 | 8/1952 | Balluff | 5/86.1 |
| 3,138,805 | 6/1964 | Piazza | 5/81.1 |
| 3,866,250 | 2/1975 | Bradford | 5/617 X |
| 4,240,169 | 12/1980 | Roos | 5/81.1 |
| 4,987,620 | 1/1991 | Sharon | 5/81.1 |
| 5,261,132 | 11/1993 | Bufford et al. | 5/617 |

FOREIGN PATENT DOCUMENTS

| | | | |
|---|---|---|---|
| 172296 | 2/1986 | European Pat. Off. | 5/86.1 |

*Primary Examiner*—Michael F. Trettel

[57] ABSTRACT

A new and improved convertible bed comprised of a stationary bed frame having a U-shaped mattress extending along two horizontal support frames thereof. The U-shaped mattress has a locking means secured to an inner portion thereof. A wheelchair support frame has a pivot portion secured to opposing sides thereof. Each pivot portion has a vertical notch and a horizontal notch therein. A lower support of the wheelchair support frame has an axle extending outwardly from end portions thereof. Each axle has a wheel coupled thereto. A foot support frame is pivotally secured to lower portions of the wheelchair support frame. Contained in the device is a back support frame having two support legs. Each of the support legs has a locking pin theresecured. Each locking pin selectively corresponds with the vertical notch or the horizontal notch of the pivot portion of the wheelchair support frame. Each of the two support legs has a handle theresecured. Each handle has a notch therein. Each notch selectively corresponds with the locking means of the stationary bed frame. An inner mattress extends along an upper surface of the foot support frame and the wheelchair support frame and the back support frame.

5 Claims, 4 Drawing Sheets

FIG 1
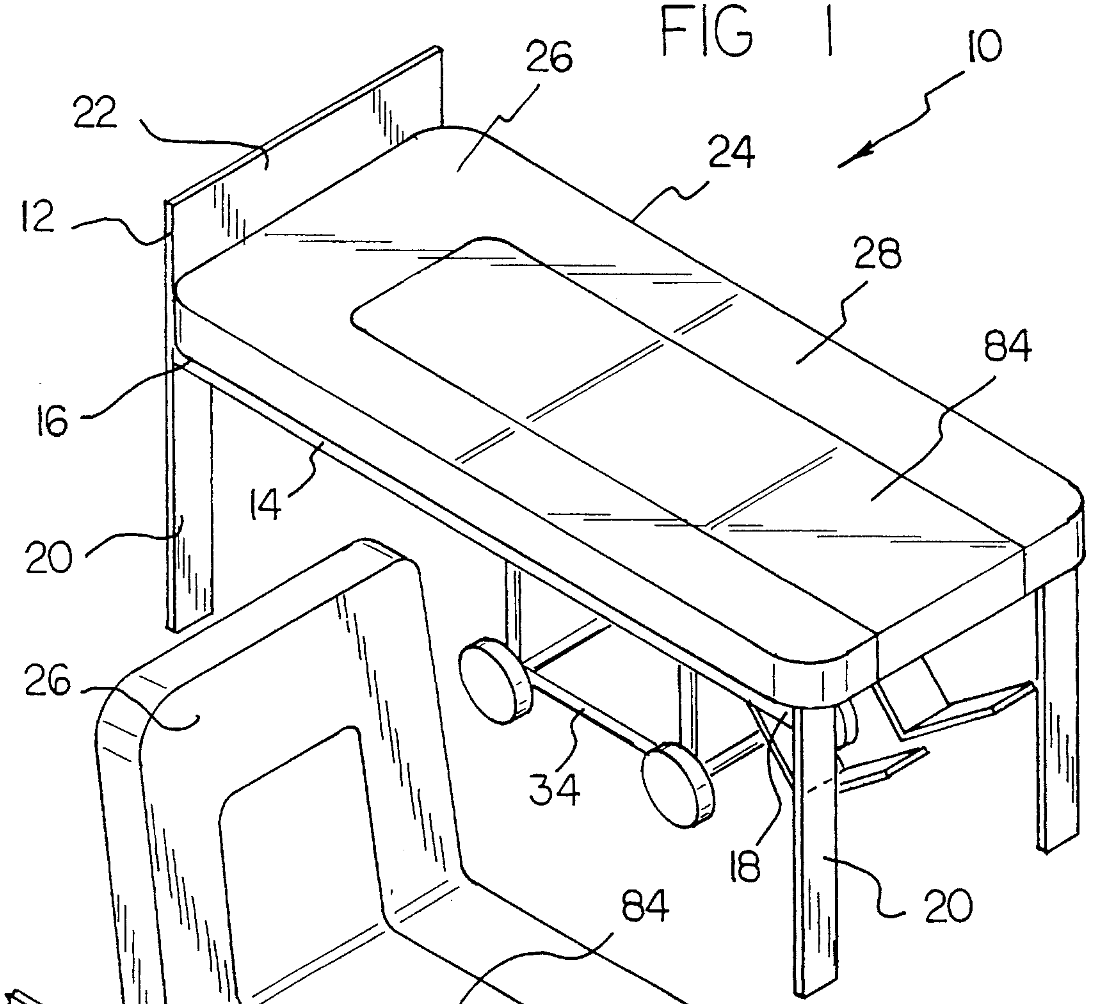
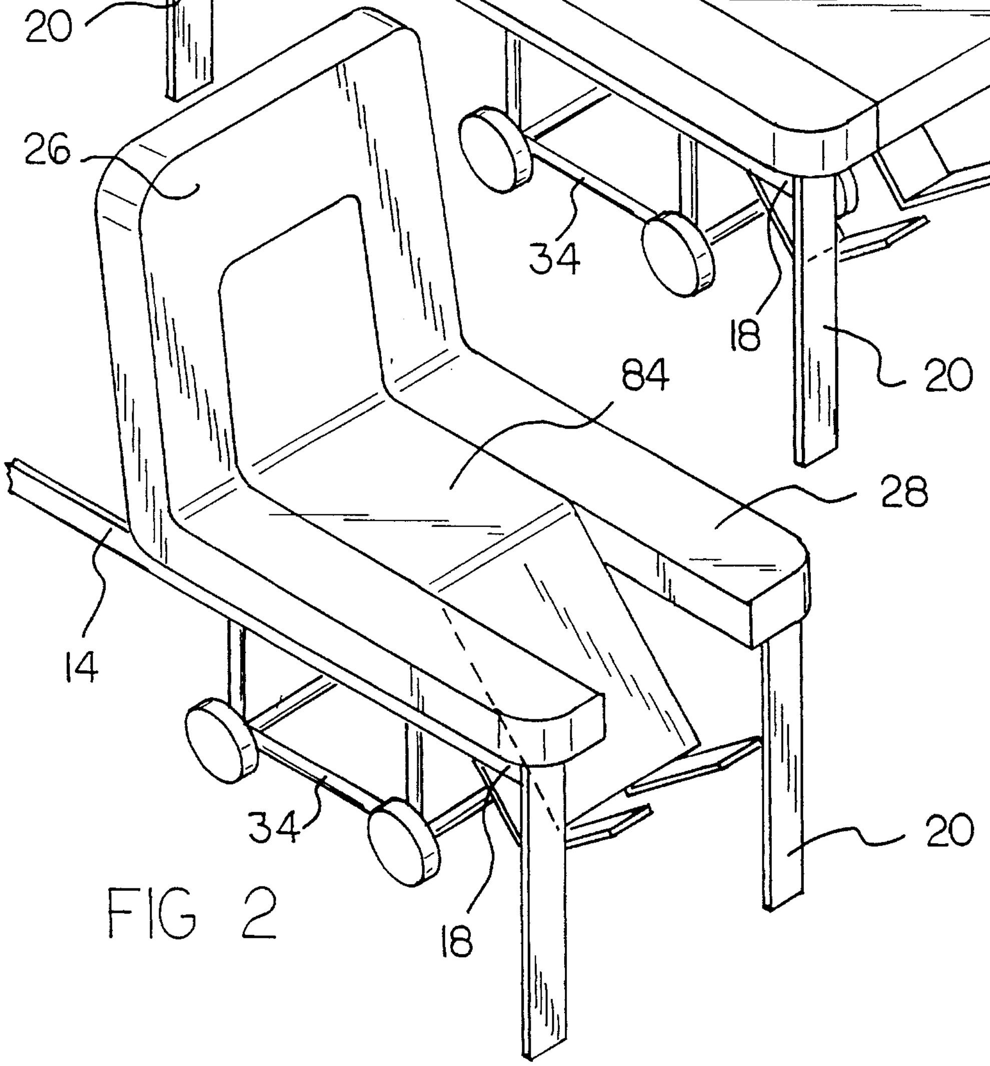
FIG 2

FIG 5
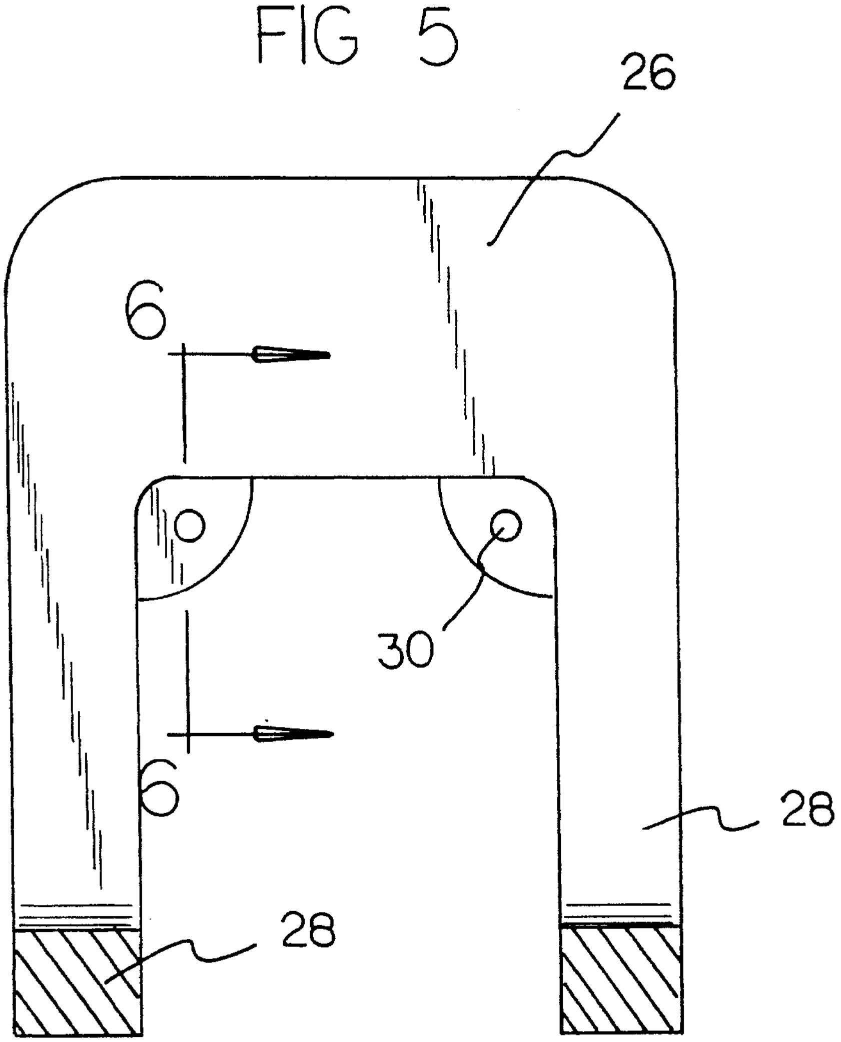
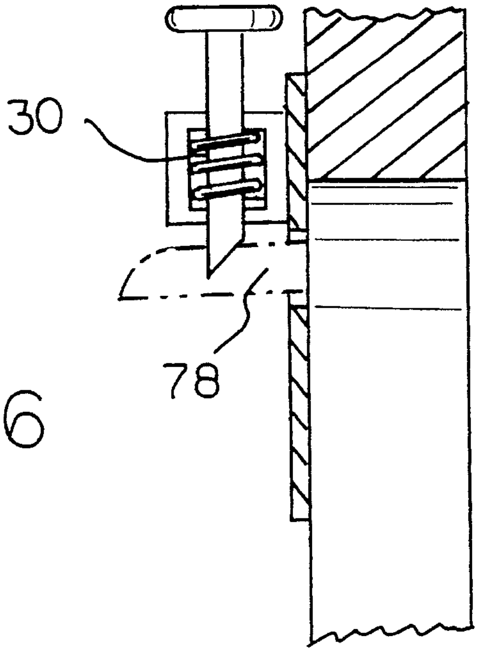
FIG 6

FIG 7
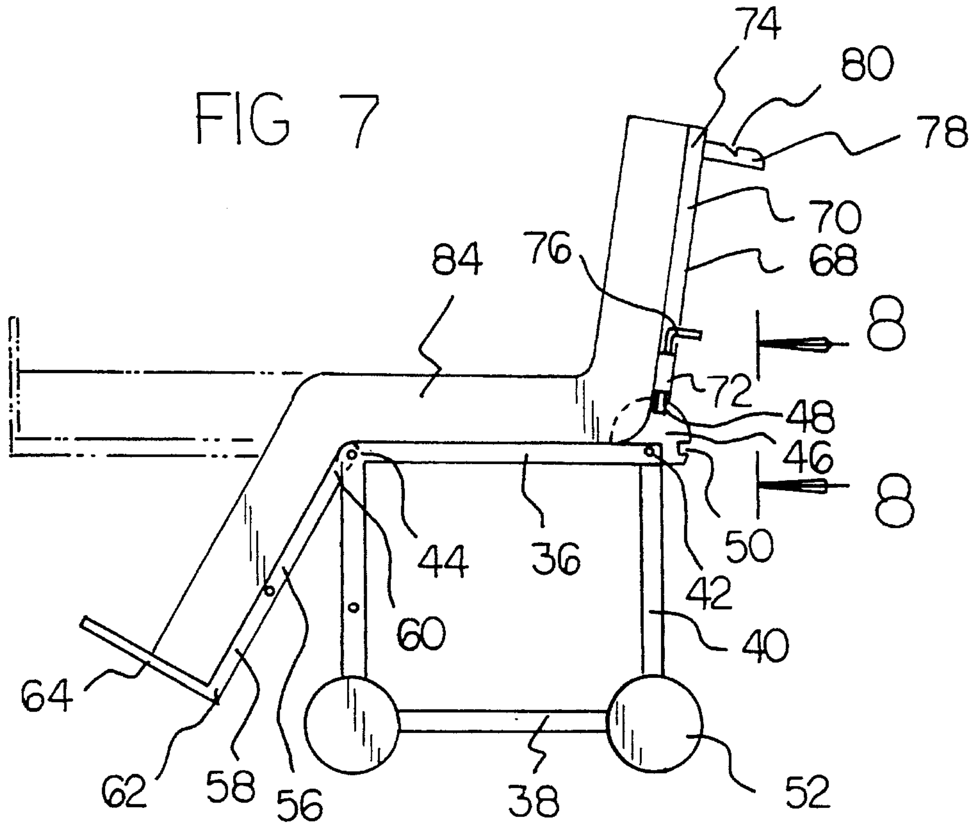
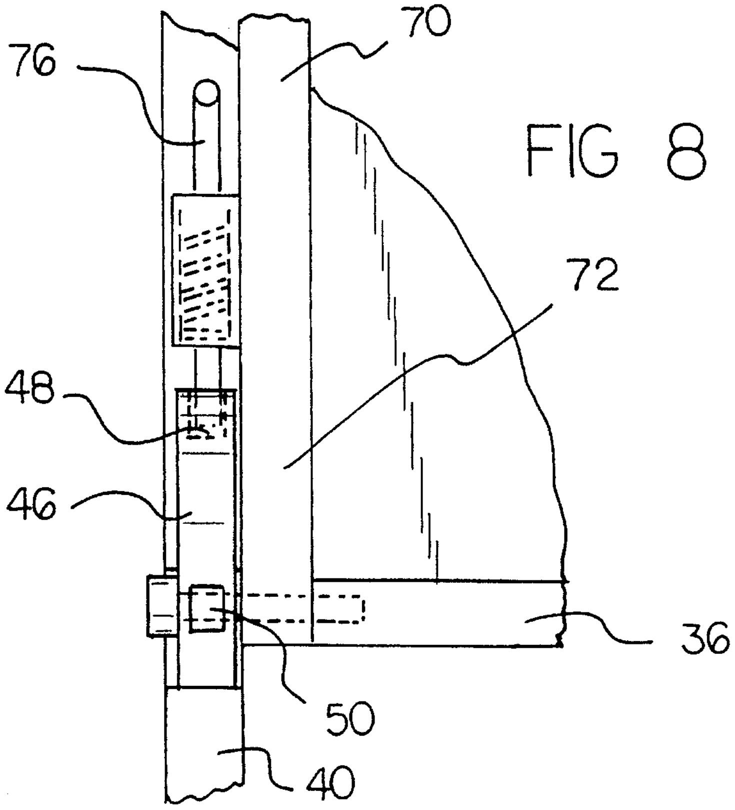
FIG 8

CONVERTIBLE BED

BACKGROUND OF THE INVENTION

1. Field of the Invention

The present invention relates to a convertible bed and more particularly pertains to converting a bed to a wheelchair for the convenience of an occupant and caregivers with a convertible bed.

2. Description of the Prior Art

The use of combined wheelchair apparatuses is known in the prior art. More specifically, combined wheelchair apparatuses heretofore devised and utilized for the purpose of combining a wheelchair with another functional apparatus are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,067,188 to Brantman discloses a sliding transfer device.

U.S. Pat. No. 5,060,960 to Branscumb et al. discloses a combination wheelchair and lifting device.

U.S. Pat. No. 5,058,221 to Abraham discloses a combination of a wheelchair and a transport device for transporting a patient.

U.S. Pat. No. 4,987,620 to Sharon discloses a combined bed and wheelchair.

U.S. Pat. No. 4,717,169 to Shaffer discloses a convertible bed and wheelchair unit.

While these devices fulfill their respective, particular objective and requirements, the aforementioned patents do not describe a convertible bed for converting a bed to a wheelchair for the convenience of an occupant and caregivers.

In this respect, the convertible bed according to the present invention substantially departs from the conventional concepts and designs of the prior art, and in doing so provides an apparatus primarily developed for the purpose of converting a bed to a wheelchair for the convenience of an occupant and caregivers.

Therefore, it can be appreciated that there exists a continuing need for new and improved convertible bed which can be used for converting a bed to a wheelchair for the convenience of an occupant and caregivers. In this regard, the present invention substantially fulfills this need.

SUMMARY OF THE INVENTION

In the view of the foregoing disadvantages inherent in the known types of combined wheelchair apparatuses now present in the prior art, the present invention provides an improved convertible bed. As such, the general purpose of the present invention, which will be described subsequently in greater detail, is to provide a new and improved convertible bed and method which has all the advantages of the prior art and none of the disadvantages.

To attain this, the present invention essentially comprises a stationary bed frame having two horizontal support frames. Each of the horizontal support frames has a proximal end portion and a distal end portion. Each of the end portions has a vertical leg extending downwardly therefrom. The proximal end portion of the two horizontal support frames have a head piece secured therebetween. A U-shaped mattress extends along the two horizontal support frames. The U-shaped mattress has an upper end and two lower extents. The upper end has a locking means secured to an inner portion thereof. The device contains a wheelchair support frame having a generally square upper horizontal support frame and a generally square lower horizontal support frame. The upper support frame and the lower support frame are secured together by four vertical support legs. The upper support frame has an upper portion and a lower portion. The upper portion has a pivot portion secured to opposing sides thereof. Each pivot portion has a vertical notch and a horizontal notch therein. The lower support frame has an axle extending outwardly from end portions thereof. Each axle has a wheel coupled thereto. The device contains a foot support frame having two support legs. Each of the support legs has a proximal end and a distal end. Each proximal end is pivotally secured to lower portions of the upper support frame of the wheelchair support frame. Each distal end has a foot support extending upwardly therefrom. The device contains a back support frame having two support legs. Each of the two support legs has a proximal end and a distal end. Each proximal end has a locking pin theresecured. Each locking pin selectively corresponds with the vertical notch or the horizontal notch of the pivot portion of the wheelchair support frame. Each distal end has a handle theresecured. Each handle has a notch therein. Each notch selectively corresponds with the locking means of the stationary bed frame. An inner mattress extends along an upper surface of the foot support frame and the wheelchair support frame and the back support frame. The inner mattress selectively fits within the U-shaped mattress of the stationary bed frame.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved convertible bed which has all the advantages of the prior art combined wheelchair apparatuses and none of the disadvantages.

It is another object of the present invention to provide a new and improved convertible bed which may be easily and efficiently manufactured and marketed.

It is a further object of the present invention to provide a new and improved convertible bed which is of durable and reliable construction.

An even further object of the present invention is to provide a new and improved convertible bed which is susceptible of a low cost of manufacture with regard to both materials and labor, and which accordingly is then susceptible of low prices of sale to the consuming public, thereby making such a convertible bed economically available to the buying public.

Still yet another object of the present invention is to provide a new and improved convertible bed which provides in the apparatuses and methods of the prior art some of the advantages thereof, while simultaneously overcoming some of the disadvantages normally associated therewith.

Even still another object of the present invention is to provide a new and improved convertible bed for converting a bed to a wheelchair for the convenience of an occupant and caregivers.

Lastly, it is an object of the present invention to provide a new and improved convertible bed comprised of a stationary bed frame having a U-shaped mattress extending along two horizontal support frames thereof. The U-shaped mattress has a locking means secured to an inner portion thereof. A wheelchair support frame has a pivot portion secured to opposing sides thereof. Each pivot portion has a vertical notch and a horizontal notch therein. A lower support of the wheelchair support frame has an axle extending outwardly from end portions thereof. Each axle has a wheel coupled thereto. A foot support frame is pivotally secured to lower portions of the wheelchair support frame. Contained in the device is a back support frame having two support legs. Each of the support legs has a locking pin theresecured. Each locking pin selectively corresponds with the vertical notch or the horizontal notch of the pivot portion of the wheelchair support frame. Each of the two support legs has a handle theresecured. Each handle has a notch therein. Each notch selectively corresponds with the locking means of the stationary bed frame. An inner mattress extends along an upper surface of the foot support frame and the wheelchair support frame and the back support frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the convertible bed constructed in accordance with the principles of the present invention.

FIG. 2 is a perspective view of the present invention in an upright position.

FIG. 5 is a front partial view of the stationary bed portion of the present invention.

FIG. 6 is a cross-sectional view as taken along line 6—6 of FIG. 5.

FIG. 7 is a side elevation view of the present invention.

FIG. 8 is a cross-sectional view as taken along line 8—8 of FIG. 7.

The same reference numerals refer to the same parts through the various Figures.

DESCRIPTION OF THE PREFERRED EMBODIMENT

Figure 3:
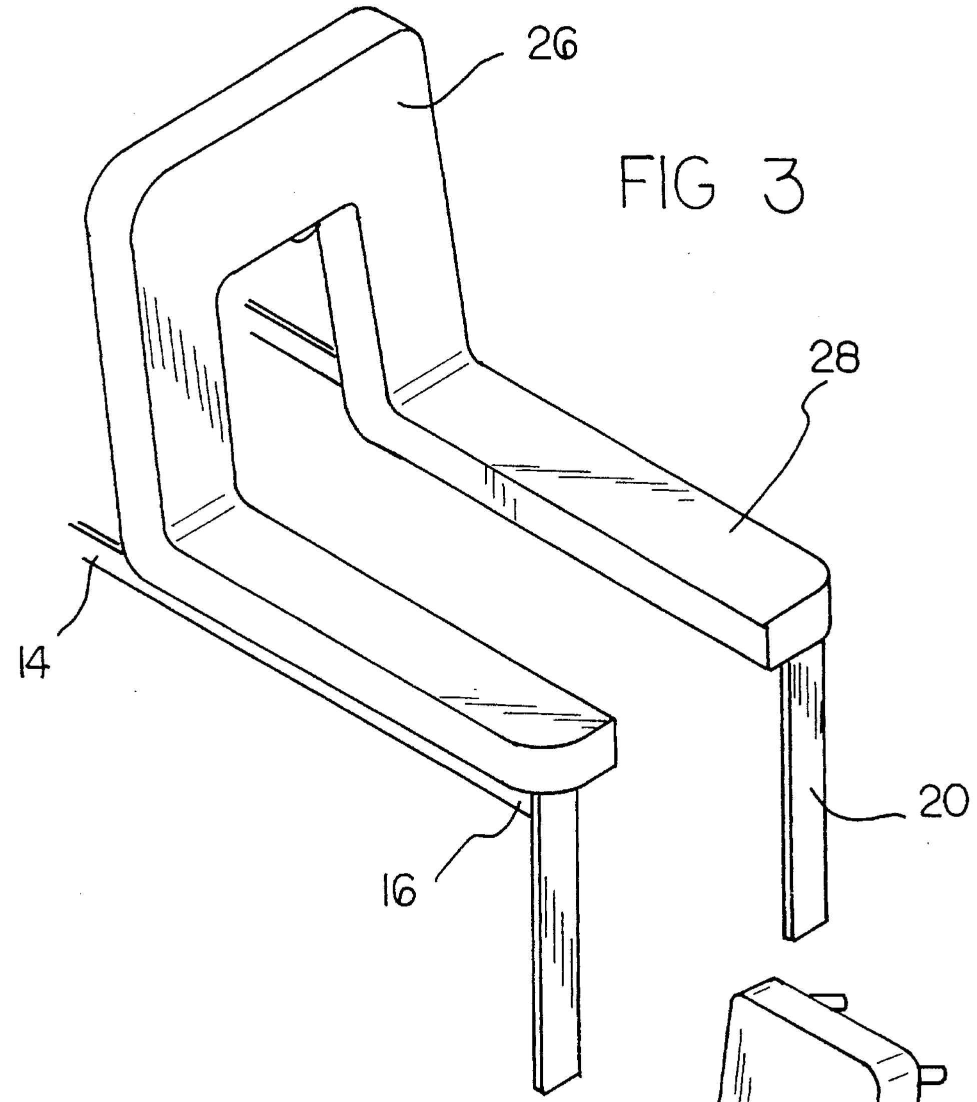
FIG. 3 is a perspective view of the stationary bed portion of the present invention.
Figure 4:
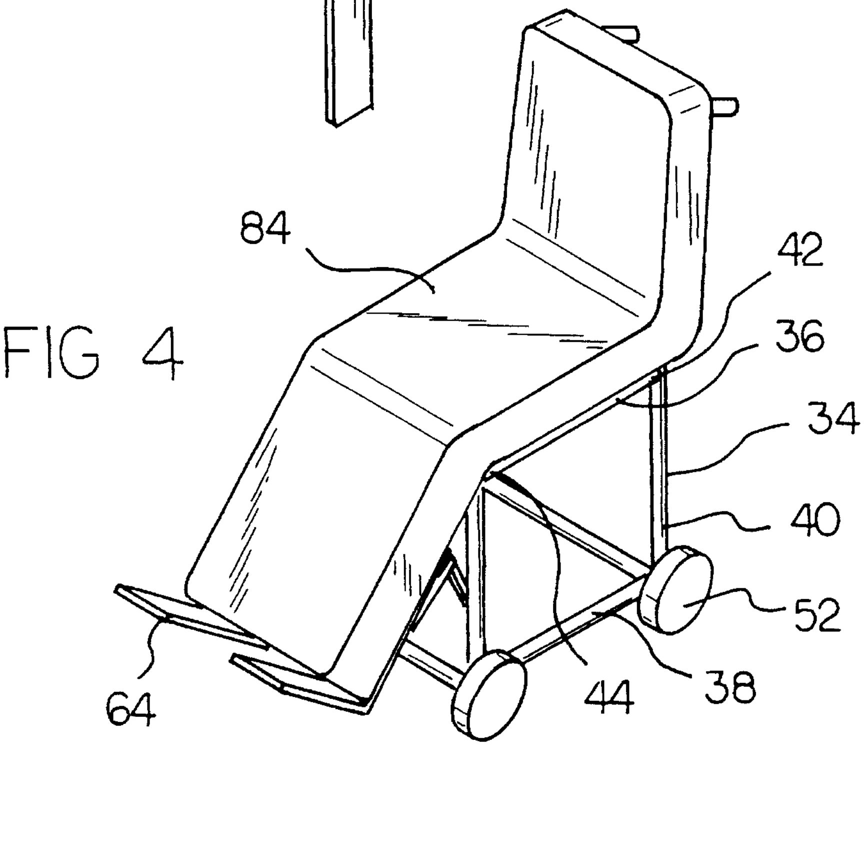
FIG. 4 is a perspective view of the wheelchair portion of the present invention.

With reference now to the drawings, and in particular, to FIG. 1 thereof, the preferred embodiment of the new and improved convertible bed embodying the principles and concepts of the present invention and generally designated by the reference number 10 will be described.

Specifically, it will be noted in the various Figures that the device relates to a new and improved convertible bed for converting a bed to a wheelchair for the convenience of an occupant and caregivers. In its broadest context, the device consists of a stationary bed frame, a wheelchair support frame, a foot support frame, a back support frame, and an inner mattress.

The device 10 contains a stationary bed frame 12 having two horizontal support frames 14. Each of the horizontal support frames 14 has a proximal end portion 16 and a distal end portion 18. Each of the end portions 16,18 has a vertical leg 20 extending downwardly therefrom. The proximal end portion 16 of the two horizontal support frames 14 have a head piece 22 secured therebetween. A U-shaped mattress 24 extends along the two horizontal support frames 14. The U-shaped mattress 24 has an upper end 26 and two lower extents 28. The upper end 26 has a locking means 30 secured to an inner portion thereof. More specifically, the locking means 30 is a spring biased lock pin on opposite sides of the upper end that an operator can easily pull the lock pins to engage or disengage.

The device 10 contains a wheelchair support frame 34 having a generally square upper horizontal support frame 36 and a generally square lower horizontal support frame 38. The upper support frame 36 and the lower support frame 38 are secured together by four vertical support legs 40. The upper support frame 36 has an upper portion 42 and a lower portion 44. The upper portion 42 has a pivot portion 46 secured to opposing sides thereof. Each pivot portion 46 has a vertical notch 48 and a horizontal notch 50 therein. The lower support frame 38 has an axle extending outwardly from end portions thereof. Each axle has a wheel 52 coupled thereto. The wheels 52 allow the wheelchair support frame 34 to be easily transported.

The device 10 contains a foot support frame 56 having two support legs 58. Each of the support legs 58 has a proximal end 60 and a distal end 62. Each proximal end 60 is pivotally secured to the lower portion 44 of the upper support frame 36 of the wheelchair support frame 34. Each distal end 62 has a foot support 64 extending upwardly therefrom. The foot support frame can be raised to a position parallel to the wheelchair support frame 34 or lowered to a position perpendicular to the wheelchair support frame 34.

The device 10 contains a back support frame 68 having two support legs 70. Each of the two support legs 70 has a proximal end 72 and a distal end 74. Each proximal end 72 has a locking pin 76 theresecured. Each locking pin 76 selectively corresponds with the vertical notch 48 or the horizontal notch 50 of the pivot portion 46 of the wheelchair support frame 34. When the locking pin 76 engages the vertical notch 48, the back support frame 68 is perpendicular to the wheelchair support frame 34. When the locking pin 76 engages the horizontal notch 50, the back support frame 68 lies parallel with the wheelchair support frame 34. Each distal end 74 has a handle 78 theresecured. Each handle 78 has a notch 80 therein. Each notch 80 selectively corresponds with the locking means 30 of the stationary bed frame 12.

An inner mattress 84 extends along an upper surface of the foot support frame 56 and the wheelchair support frame 34 and the back support frame 68. The inner mattress 84 selectively fits within the U-shaped mattress 24 of the stationary bed frame 12.

The present invention is an adjustable bed that has a removable section that can be converted to a wheelchair for the convenience of the occupant and the caregivers.

It is mounted on top of a wheelchair-like aluminum support frame with four small wheels at the corners. Its mattress is approximately twin size. A center portion of the mattress, that is about half as wide as the mattress, converts into a backrest and seat for the wheelchair; it extends from just below the top quarter of the mattress to its end. Two inverted L-shaped back supports with bottom pivot joints are secured to the rear of the backrest and lock it into the mattress. When locked into the mattress, the backrest can be moved into any position desired, horizontal, angled, and vertical. A vertically positioned footrest at the front can be swung forward at an angle and locked in place. The front portion of the center section swings down on a pivot and locks in place.

To convert the bed into a wheelchair, verify the center section is locked into the mattress at its top. Swing the top end of the mattress (including the center section) up into a vertical position to form the chair's backrest and lock it into place. Swing its bottom end down into a vertical position, lift the footrest up, and lock them in place, unlock the chair section and remove it.

The bed can be easily converted into a wheelchair, to transport nursing home and hospital patients from their rooms to recreation areas and other sections of the facility, without having to move the patients from their beds.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved convertible bed for converting a bed to a wheelchair for the convenience of an occupant and caregivers comprising, in combination:

a stationary bed frame having two horizontal support frames, each of the horizontal support frames having a proximal end portion and a distal end portion, each of the end portions having a vertical leg extending downwardly therefrom, the proximal end portion of the two horizontal support frames having a head piece secured therebetween, a U-shaped mattress extending along the two horizontal support frames, the U-shaped mattress having an upper end and two lower extents, the upper end having a locking means secured to an inner portion thereof;

a wheelchair support frame having a generally square upper horizontal support frame and a generally square lower horizontal support frame, the upper support frame and the lower support frame secured together by four vertical support legs, the upper support frame having an upper portion and a lower portion, the upper portion having a pivot portion secured to opposing sides thereof, each pivot portion having a vertical notch and a horizontal notch therein, the lower support frame having an axle extending outwardly from end portions thereof, each axle having a wheel coupled thereto;

a foot support frame having two support legs, each of the support legs having a proximal end and a distal end, each proximal end pivotally secured to the lower portion of the upper support frame of the wheelchair support frame, each distal end having a foot support extending upwardly therefrom;

a back support frame having two support legs, each of the two support legs having a proximal end and a distal end, each proximal end having a locking pin theresecured, each locking pin selectively corresponding with the vertical notch or the horizontal notch of the pivot portion of the wheelchair support frame, each distal end having a handle theresecured, each handle having a notch therein, each notch selectively corresponding with the locking means of the stationary bed frame;

an inner mattress extending along an upper surface of the foot support frame and the wheelchair support frame and the back support frame, the inner mattress selectively fits within the U-shaped mattress of the stationary bed frame.

2. A new and improved convertible bed for converting a bed to a wheelchair for the convenience of an occupant and caregivers comprising, in combination:

a stationary bed frame having a U-shaped mattress extending along two horizontal support frames thereof, the U-shaped mattress having a locking means secured to an inner portion thereof;

a wheelchair support frame having a pivot portion secured to opposing sides thereof, each pivot portion having a vertical notch and a horizontal notch therein, a lower support of the wheelchair support frame having an axle extending outwardly from end portions thereof, each axle having a wheel coupled thereto;

a foot support frame pivotally secured to lower portions of the wheelchair support frame;

a back support frame having two support legs, each of the support legs having a locking pin theresecured, each locking pin selectively corresponding with the vertical notch or the horizontal notch of the pivot portion of the wheelchair support frame, each of the two support legs having a handle theresecured, each handle having a notch therein, each notch selectively corresponding with the locking means of the stationary bed frame;

an inner mattress extending along an upper surface of the foot support frame and the wheelchair support frame and the back support frame.

3. The convertible bed as described in claim 1 and further including wherein the locking means is a spring biased lock pin that selectively engages each notch in each handle of the back support frame.

4. The convertible bed as described in claim 2 and further including a foot support extending upwardly from the two support legs of the foot support frame.

5. The convertible bed as described in claim 4 and further including a head piece secured to the stationary bed frame.

* * * * *